Figure 1:
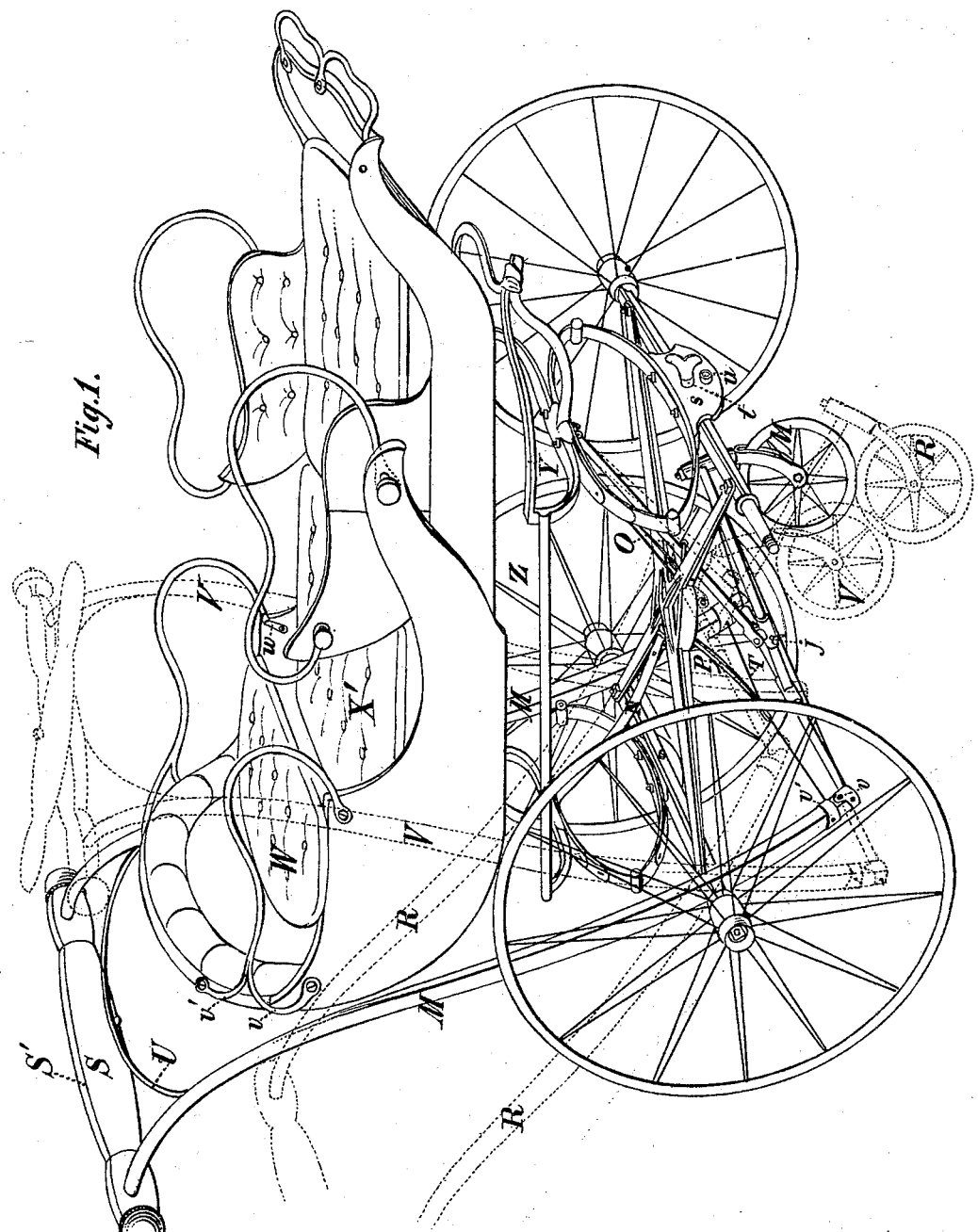

(Model.)

2 Sheets—Sheet 1.

H. C. SEELY.
CHILD'S CARRIAGE.

No. 298,784.   Patented May 20, 1884.

WITNESSES:

INVENTOR:
Horace C. Seely (Model.) 2 Sheets—Sheet 2.
H. C. SEELY.
CHILD'S CARRIAGE.
No. 298,784. Patented May 20, 1884.
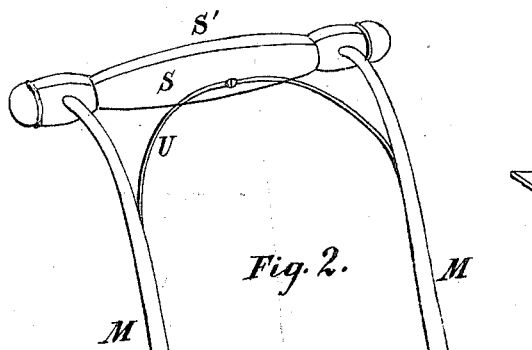
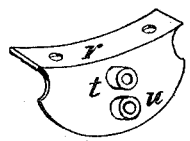
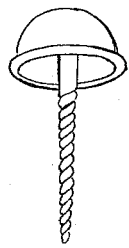
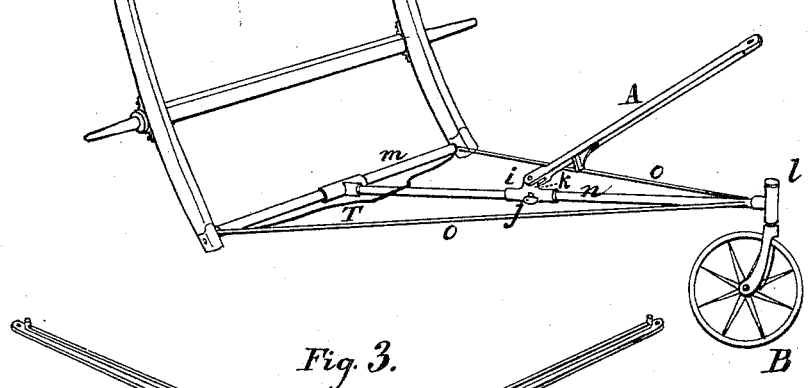
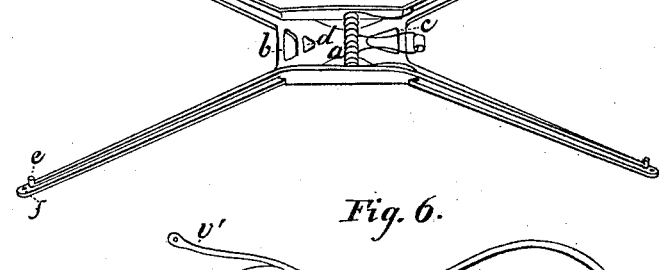
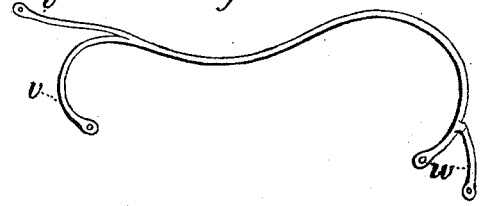
WITNESSES:  
Horace G. Van Court  
J. S. Minner
INVENTOR:  
Horace C. Seely

UNITED STATES PATENT OFFICE.

HORACE C. SEELY, OF PHILADELPHIA, PENNSYLVANIA.

CHILD'S CARRIAGE.

SPECIFICATION forming part of Letters Patent No. 298,784, dated May 20, 1884.

Application filed October 14, 1881. (Model.)

*To all whom it may concern:*

Be it known that I, HORACE C. SEELY, a citizen of the United States, residing at Philadelphia, in the county of Philadelphia and State of Pennsylvania, have invented certain new and useful Improvements in Children's Carriages; and I do hereby declare that the following is a full, clear, and exact description of the invention, which will enable others skilled in the art to which it appertains to make and use the same.

My invention relates, principally, to parts connected with the running-gear of a child's carriage, by which I produce various changes and movements that are desirable and useful, including, also, parts connected with the body, and which I fully describe in the following specification and illustrate in the accompanying drawings, reference being had to the figures and letters marked thereon.

Figure 1 is a perspective view of my improved carriage with the body raised slightly above the running-gear, to more fully show the combination of the various parts. Fig. 2 shows my improved handle and its combination with parts which actuate a caster-wheel, the uses of which will hereinafter be fully explained. Fig. 3 shows the under surface of a reach, which connects the axles and affords attachment for other parts, hereinafter described. Fig. 4 is a device by which the body of the carriage is attached to the axles, and by which a lateral rocking motion is given to the carriage-body. Fig. 5 is an end cap, which screws into the ends of the thicker part of the two-piece push-bar S S', to hold the parts together. Fig. 6 is a brace-guard to add depth to the seat, and at the same time to strengthen the back and sides of the carriage, the application of which is shown in Fig. 1 of my drawings.

The handle as shown in Fig. 2, being the main feature of my invention, is composed of the push-bar S S' and two slightly-curved uprights, as is usual; but the latter are journaled on the rear axle, about one-fifth of the same extending below the latter. The push-bar is split into two pieces, S S', about two-thirds of which (shown in Fig. 1, S) is secured to the uprights in the usual way, and the third shown at S', Fig. 1, is secured to its fellow by a bolt through the center of both, allowing it to turn at right angles thereon for the purpose of forming a support for a mosquito-bar. The two pieces of said cross-bar are also held together at each end by the end caps, one of which is shown in Fig. 5, and by which the parts of said push-bar are bound firmly together and a neat finish given to the ends.

In order to brace the handle against lateral strain, I secure the ends of the curved brace U to the uprights M and its center to the push-bar S S' by means of the bolt which holds the two pieces of the push-bar together. I journal the uprights M to the rear axle by means of U-shaped fastenings encircling the axle and screwed or bolted to the uprights M M. By this arrangement the handle can be adjusted to any desired height for either a short or tall person, or allow it to be thrown forward over the body to form a mosquito-canopy, and at the same time prevent the body rocking.

That the various movements and uses mentioned above may be secured, I journal a triangular attachment to the lower ends of the uprights M M, by means of which, in connection with other parts hereinafter described, the carriage is controlled. The said triangular attachment (shown in Fig. 2) is composed of the pieces $m$ and $n$, forming a T, and the side braces, $o$ $o$, which form the triangle. The said triangle may be cast in one piece, or made up from gas pipe and fittings, as desired. A socket, $l$, is placed perpendicluar to the plane, and at the apex of said triangle, to receive the caster-wheel B, as shown in Fig. 2. A sleeve, $i$, with its lug $k$ and set-screw $j$, is placed loosely on the center piece, $n$, of the triangle, to which a brace or arm, A, is hinged, said brace A being hinged also to the front spring, frame, or to the center of an upward-curved front axle. This combination secures all the desired movements of the handle and complete control of the carriage; but unless the arm A is hinged direct to the front axle, and the latter braced by a rod extended from said axle, and attached to the reach or rear axle, the brace-strap O and check-strap P, as shown in Fig. 1, will be necessary to prevent undue strain on the front spring when the handle is depressed or elevated, as in the act of crossing a curb.

In order to avoid the unnecessary wear of the caster-wheel B, and also to prevent the same striking against the curbstone when crossing it, said caster-wheel B is held up out of the way by means of the spring a, attached to the under part of the reach, as shown in Fig. 3, and also its combination with the arm or brace A in Fig. 1. The said spring a, by engaging the arm A, lifts the caster-wheel B from the ground or pavement, and retains it in that position until said caster-wheel is forced down by depressing the handle.

The reach, Fig. 3, is a malleable casting, sufficiently strong to sustain the strain thrown on it in the act of elevating the front or lifting the rear wheels when crossing a curb or turning the carriage around.

The attachments b and c (shown in Fig. 3) are for the brace-strap O and check-strap P, and their use is shown in Fig. 1.

The rocking device (shown in Fig 4) is riveted or bolted to the under side of the lower half of each spring, the under or lower side of the flange r resting on the upper surface of the axle, a thumb-screw passing through the hole at t, screwing into the axle, thereby holding the body of the carriage firmly thereon, said body being secured to the upper half of the springs above, as shown in Fig. 1. When it is desired to rock the body laterally, the thumb-screw is drawn from the hole t and inserted in the hole u, being screwed into the axles, as before, which admits of the body being rocked on the running-gear. The brace-guard, Fig. 6, is a malleable casting, and applied to the rear part of the carriage-body, while it also serves as a guard to retain a child in the seat. The uses and method of attaching this brace-guard to the carriage are plainly shown in Fig. 1 of my drawings.

The pillow W (shown in Fig. 1 with the ends resting on the sides of the body of the carriage) is for a child's head to rest on when lying down. The same fits into the vacant space below the curved line of upholstering in the back of the rear seat.

The part indicated by X' is the bottom of the rear seat slid forward, uniting with a part of the front seat to form a bed the full length of the carriage. The object of my invention is to combine, within the space occupied by an ordinary-sized one-seated carriage for one child, a carriage the body of which may be extended to afford space for an extra seat, and also form a bed, pillow included, on which a child may lie comfortably its full length, and, if desired, rocked thereon, as if lying in a cradle; but in order to use this combination practically and conveniently, a suitable handle and gear are required, which my invention is designed to furnish.

By extending the body of the carriage and unfolding the parts that compose the front seat, said parts may be placed to form the bed shown in Fig. 1 of my drawings. The said drawings show the upper portion of the back of the rear seat upholstered for a short distance from the top, with the remaining space between it and the bottom of the seat left bare of upholstering to receive the detachable portion W, into which the latter fits, and when so placed the back presents the appearance of being upholstered in the usual manner.

The pillow W is a thin board or other suitable substance, with the upholstering tacked or sewed to it, and may be removed from its vertical position and laid horizontally and on a plane with the bed across the rear seat, with its ends resting on the sides of the carriage and with the upholstered surface up, to form a pillow for a child's head to rest on; but in order to make the bed long enough, I move the bottom of the rear seat, X', forward, uniting it with the unfolded parts of the front seat, thereby making the bed complete.

The adjustable handle is the main feature of my invention, the other parts being auxiliary, though necessary to make up the complete combination. The handle being journaled to the axle admits of it being swung forward over the body, out of the way when in the house, and by separating the two-piece push-bar a mosquito-canopy is readily formed, while at the same time the cradle is locked to prevent the latter rocking. I extend the uprights M below the axle to secure a leverage, by which the caster-wheel B is actuated, and by which the handle is held in the required position to control the movements of the carriage.

The body of the carriage, when extended and a child is placed in the front seat or laid down at full length, becomes too heavy in front to be tilted easily, as in the act of crossing a curb or turning a street-corner, with the handle attached to the carriage in the usual manner, and to remedy which I fulcrum the uprights M M on the axle, said uprights M M forming levers by which the caster-wheel B is pried down, thereby raising the front wheels, allowing them to mount upon a curbstone or other obstruction, and when the front wheels are on the curbstone and the push-bar is raised up, as in the act of lifting the hind wheels over the curbstone, the spring a at the center of the reach, Fig. 3, and by means of the arm A, connected therewith, lifts the fifth or caster wheel B up, so that it may not strike against or catch on the curbstone when the carriage is pushed forward; but after depressing the push-bar, and the front wheels are on the curb's top, the push-bar S S' must be lifted up, otherwise the caster-wheel B will be run into the gutter and against the curbstone, stopping the carriage and unnecessarily straining the caster-wheel B and its connections by the sudden jar. By the use of this caster-wheel B the heavy weight thrown on the front of the carriage is easily lifted, and without danger of breaking the handle, which would be the case were the handle fixed rigidly to the carriage in the usual way.

In crossing curbs alone, it would not be necessary to have the small fifth-wheel B swiveled; but in turning the carriage the necessity of said wheel working on a pivot can be readily seen.

The check-strap P is to limit the upward and forward motion of the handle, sustaining the weight of the rear part of the carriage when lifted by the handle. Without this check-strap P, undue strain would be thrown on the front spring, causing a racking motion of the body to the rear.

In order to avoid bending the piece $m$ between the two uprights M, forming the base of the triangle, I do not attach the check-strap P to it, but attach said strap to the stirrup T, thereby obtaining the necessary strength without adding unnecessary weight to the carriage.

The brace-strap O, one end of which is attached to the reach at $c$ and the other to a frame or under part of the upper half of the front spring at its center, is to oppose the strain exerted on the spring by the arm or brace A. Were the said arm or brace A attached to the front axle, both check and brace straps could be dispensed with, as all the strain in tilting and lifting the carriage would then be thrown on the reach and axles.

The triangle composed of the pieces $m$ $n$ $o$ $o$ may be made long enough to place the caster-wheel B forward of the periphery of the front wheels, to obtain its bearing on the top of the curbstone; but as this arrangement would add weight to the carriage and further complicate the parts, I prefer the caster-wheel B to have its bearing on the flagstone or pavement under and a little back of the front axle, as shown in my drawings, Fig. 1.

In said drawings the position of the handle when at its usual position is shown at M, and that of the caster-wheel also at M. In the act of crossing a curb or turning the carriage around, the position of the handle, and also that of the caster-wheel, is shown in dotted lines at R. The same, when pushed forward over the body of the carriage to form a support for a fly-net, is shown at V. The check-strap P must be shortened, lengthened, or released according to the adjustment of the handle, as will be seen by reference to Fig. 1 of my drawings. The handle is fixed in any required position by moving the sleeve $i$ backward or forward on the center piece, $n$, of the triangle, at any point between the latter's base and apex, by means of the set-screw $j$.

Having thus fully described my invention, what I desire to secure by Letters Patent is—

1. The handle having its uprights M journaled upon the axle and provided with the two-piece push-bar S S' and brace U, said two-piece push-bar being pivoted at its center and secured by the end caps, substantially as described.

2. The caster-wheel B and its connections, consisting of the triangle composed of its parts $m$ $n$ $o$ $o$, socket $l$, and provided with the sliding sleeve $i$, with its hinge-lug $k$, set-screw $j$, and hinged to the arm A, the latter connected with the lifting-spring $a$, and front spring, axle, or frame, to actuate the said caster-wheel B through the uprights M of the handle, substantially as described.

3. The sliding sleeve $i$, provided with the set-screw $j$, and combined with the arm A and part $n$ of the triangle, to produce an adjustable handle, substantially as described.

4. The combination, with the handle and reach, of the stirrup T and check-strap P, substantially as described.

5. The combination, with the reach and front spring or frame, of the brace-strap O, substantially as described.

6. The rocking device, Fig. 4, combined with the spring by its flange $r$ and with the axle through holes $t$ and $u$, substantially as described.

7. The brace-guard, Fig. 6, with its prongs $v$ $v'$ $w$, combined with the carriage-body, substantially as described.

8. The detachable pillow W, to combine with the back or sides of the carriage-body, substantially as described.

HORACE C. SEELY.

Witnesses:
H. D. HOVER,
THEO. D. RAND.